US012632489B1

(12) United States Patent
Raby et al.

(10) Patent No.: US 12,632,489 B1
(45) Date of Patent: May 19, 2026

(54) GENERATION OF CONTEXT FOR A QUESTION SUBMITTED TO A GENERATIVE LANGUAGE MACHINE LEARNING MODEL

(71) Applicant: INTERNATIONAL BUSINESS MACHINES CORPORATION, Armonk, NY (US)

(72) Inventors: Joseph Raby, Long Beach, CA (US); Diane McPhee, Huntington Beach, CA (US); Haibing Qiao, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/007,679

(22) Filed: Jan. 2, 2025

(51) Int. Cl.
| | |
|---|---|
| *G06F 16/00* | (2019.01) |
| *G06F 16/383* | (2019.01) |
| *G06F 40/35* | (2020.01) |

(52) U.S. Cl.
CPC ............ *G06F 16/383* (2019.01); *G06F 40/35* (2020.01)

(58) Field of Classification Search
CPC ............................... G06F 16/383; G06F 40/35
See application file for complete search history.

(56) References Cited

U.S. PATENT DOCUMENTS

| | | | | |
|---|---|---|---|---|
| 8,645,390 B1* | 2/2014 | Oztekin | .............. | G06F 16/9535 |
| | | | | 707/721 |
| 11,977,854 B2 | 5/2024 | Tunstall-Pedoe et al. | | |
| 12,222,898 B1* | 2/2025 | Madan | ................... | G06F 16/148 |
| 12,353,469 B1* | 7/2025 | Mahabadi | ............. | G06F 16/332 |

(Continued)

FOREIGN PATENT DOCUMENTS

| | | |
|---|---|---|
| CN | 117951274 A | 4/2024 |
| CN | 117592489 B | 5/2024 |

(Continued)

OTHER PUBLICATIONS

Pregasen, M. How to Optimize Long Prompts with Corpus-In-Context Prompting. Jul. 2024. [online], [retrieved on Oct. 30, 2025]. Retrieved from the Internet <URL: https://www.vellum.ai/blog/how-to-optimize-long-context-prompts-with-corpus-in-context-prompting> (Year: 2024).*

(Continued)

*Primary Examiner* — Syed H Hasan
(74) *Attorney, Agent, or Firm* — Harrity & Harrity, LLP

(57) ABSTRACT

A method, computer program product, and computer system. An embedding model is applied to a question to generate a question embedding. The question is to be submitted with context to a trained generative language machine learning model. N documents for inferring the context are a subset of a corpus of C documents that was divided into chunks and associated chunk embeddings. A document tracking database is queried to select M unallowed documents due to lack of access permission. A nearest neighbor (NN) search algorithm is determined to be a K-Nearest Neighbor (KNN) or an Approximate Nearest Neighbor (ANN) search algorithm. An ordered list of ranked chunk embeddings, which is generated by executing the NN search algorithm to match the question embedding to a subset of the chunk embeddings, does not include the chunk embeddings of: the M unallowed documents and the C documents exclusive of the N documents.

20 Claims, 6 Drawing Sheets

(56) References Cited

U.S. PATENT DOCUMENTS

| | | | | |
|---|---|---|---|---|
| 2023/0205824 A1* | 6/2023 | Jablokov | ................. | G06F 16/93 |
| | | | | 707/737 |
| 2024/0078337 A1 | 3/2024 | Kamyshenko et al. | | |
| 2024/0362497 A1* | 10/2024 | Grenader | ............. | G06N 3/0455 |
| 2025/0156458 A1* | 5/2025 | Lee | ........................ | G06F 16/355 |
| 2025/0298798 A1* | 9/2025 | Kane | ...................... | G06N 20/00 |

FOREIGN PATENT DOCUMENTS

| | | |
|---|---|---|
| CN | 118210908 A | 6/2024 |
| CN | 118069815 B | 7/2024 |
| CN | 118364087 A | 7/2024 |

OTHER PUBLICATIONS

Ong, R. Anthropic's Contextual Retrieval: A Guide With Implementation. Nov. 2024. [online] [retrieved on Oct. 31, 2025]. Retrieved from the Internet <URL: https://www.datacamp.com/tutorial/contextual-retrieval-anthropic> (Year: 2024).*

Poliakov et al., "Multi-Meta-RAG: Improving RAG for Multi-Hop Queries using Database Filtering with LLM-Extracted Metadata", arXiv:2406.13213v2 [cs.CL], Aug. 19, 2024, 10 pages.

International Searching Authority, "Notification of Transmittal of the International Search Report and the Written Opinion of the International Searching Authority, or Declaration," Patent Cooperation Treaty, Feb. 20, 2026, 13 pages, International Application No. PCT/EP2025/0846001.

Jean-Charles Risch, "Securing AI Knowledge: Implementing User Permissions in RAG Systems for Enhanced Data Protection", Medium, Aug. 19, 2024, 16 pages, doi: https://medium.com/@jcrsch/securing-ai-knowledge-implementing-user-permissions-in-rag-systems-for-enhanced-data-protection-0e16b2d5664c.

Luis Angel Pérez Ramos, "LLM Models and RAG Applications Step-by-Step—Part II—Creating the Context", InterSystems, Oct. 14, 2024, 5 pages, doi: https://community.intersystems.com/post/llm-models-and-rag-applications-step-step-part-ii-creating-context.

Usman Malik, "How to build an authorization system for your RAG applications with LangChain, Chroma DB and Cerbos", CERBOS, Dec. 20, 2024, 39 pages, doi: https://www.cerbos.dev/blog/authorization-for-rag-applications-langchain-chromadb-cerbos.

* cited by examiner

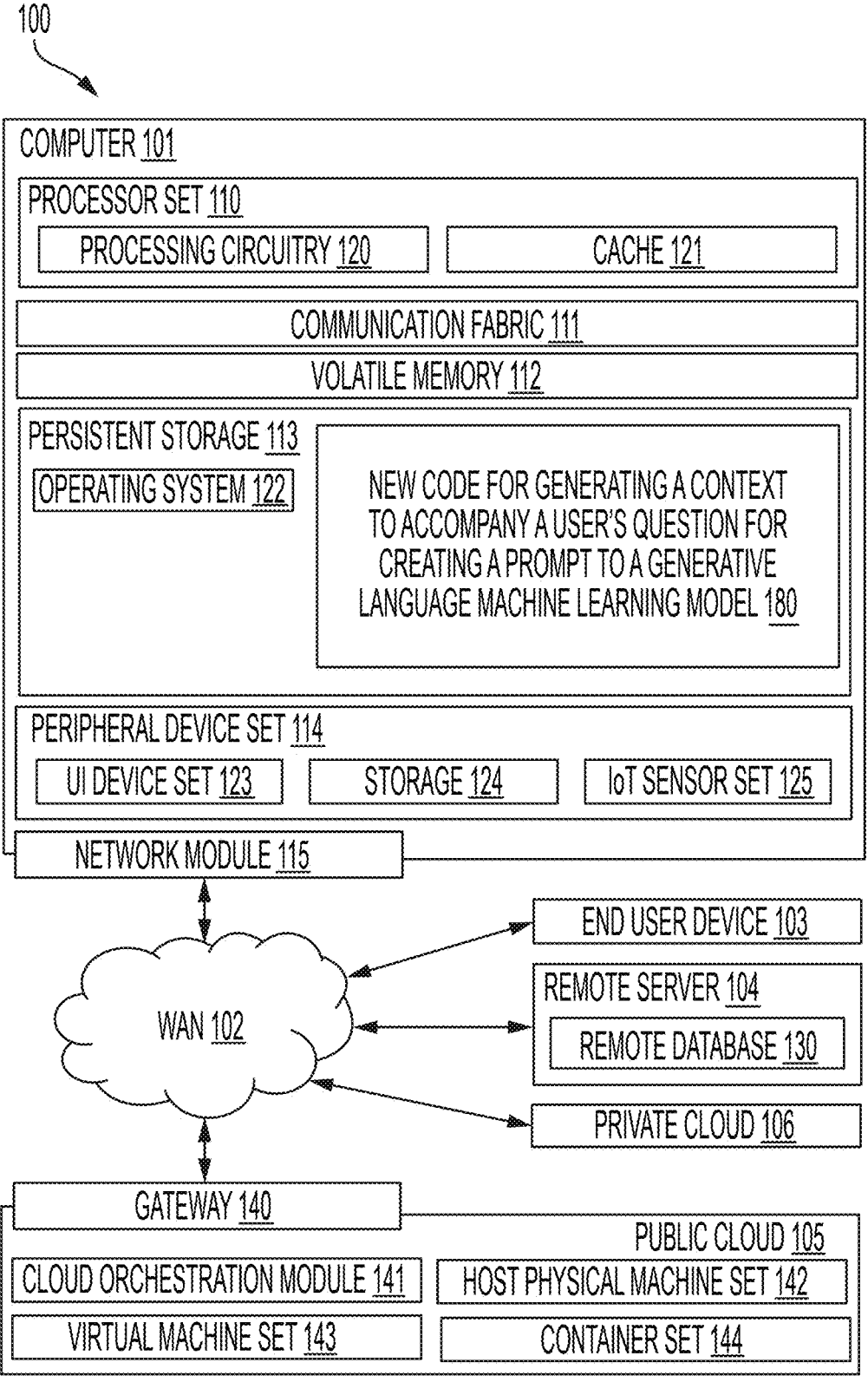

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

NEW CODE FOR GENERATING A CONTEXT TO ACCOMPANY A USER'S QUESTION FOR CREATING A PROMPT TO A GENERATIVE LANGUAGE MACHINE LEARNING MODEL 180

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

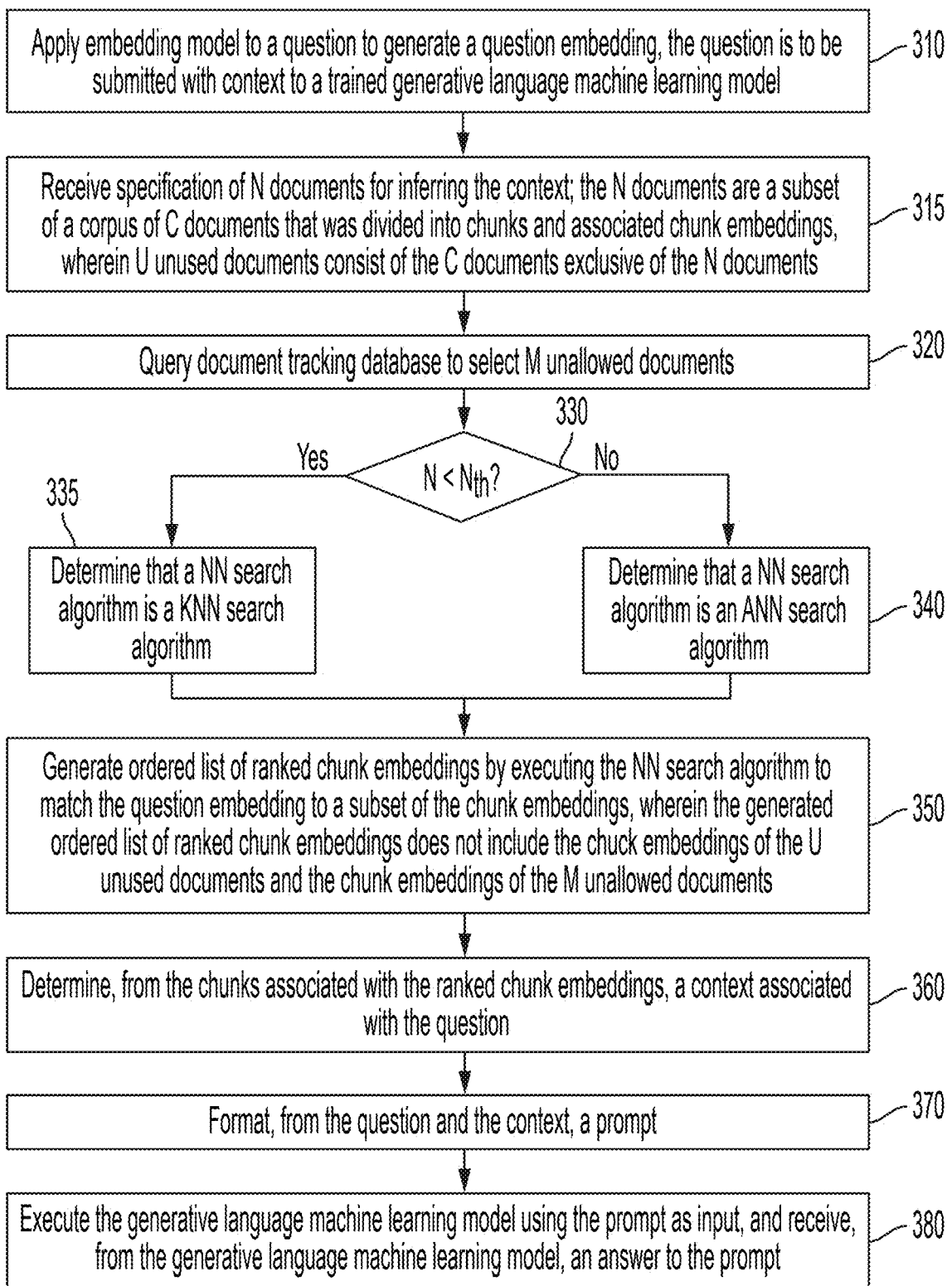

Apply embedding model to a question to generate a question embedding, the question is to be submitted with context to a trained generative language machine learning model ⟵ 310

Receive specification of N documents for inferring the context; the N documents are a subset of a corpus of C documents that was divided into chunks and associated chunk embeddings, wherein U unused documents consist of the C documents exclusive of the N documents ⟵ 315

Query document tracking database to select M unallowed documents ⟵ 320

330

Yes    $N < N_{th}$?    No

335

Determine that a NN search algorithm is a KNN search algorithm

Determine that a NN search algorithm is an ANN search algorithm ⟵ 340

Generate ordered list of ranked chunk embeddings by executing the NN search algorithm to match the question embedding to a subset of the chunk embeddings, wherein the generated ordered list of ranked chunk embeddings does not include the chuck embeddings of the U unused documents and the chunk embeddings of the M unallowed documents ⟵ 350

Determine, from the chunks associated with the ranked chunk embeddings, a context associated with the question ⟵ 360

Format, from the question and the context, a prompt ⟵ 370

Execute the generative language machine learning model using the prompt as input, and receive, from the generative language machine learning model, an answer to the prompt ⟵ 380

FIG. 3

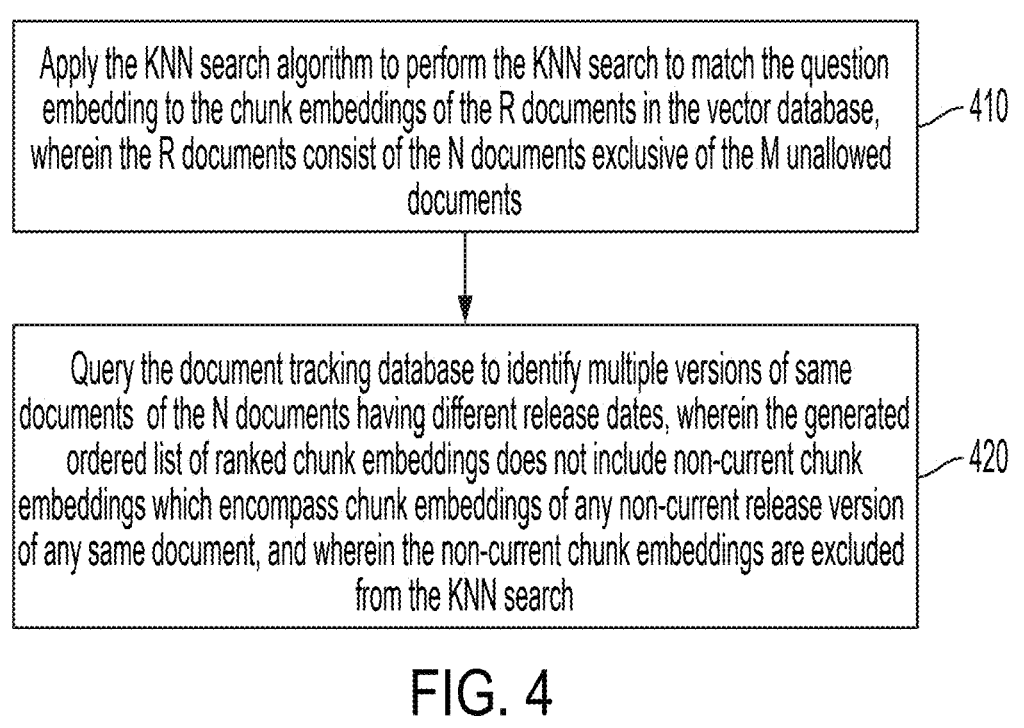

Apply the KNN search algorithm to perform the KNN search to match the question embedding to the chunk embeddings of the R documents in the vector database, wherein the R documents consist of the N documents exclusive of the M unallowed documents — 410

Query the document tracking database to identify multiple versions of same documents of the N documents having different release dates, wherein the generated ordered list of ranked chunk embeddings does not include non-current chunk embeddings which encompass chunk embeddings of any non-current release version of any same document, and wherein the non-current chunk embeddings are excluded from the KNN search — 420

FIG. 4

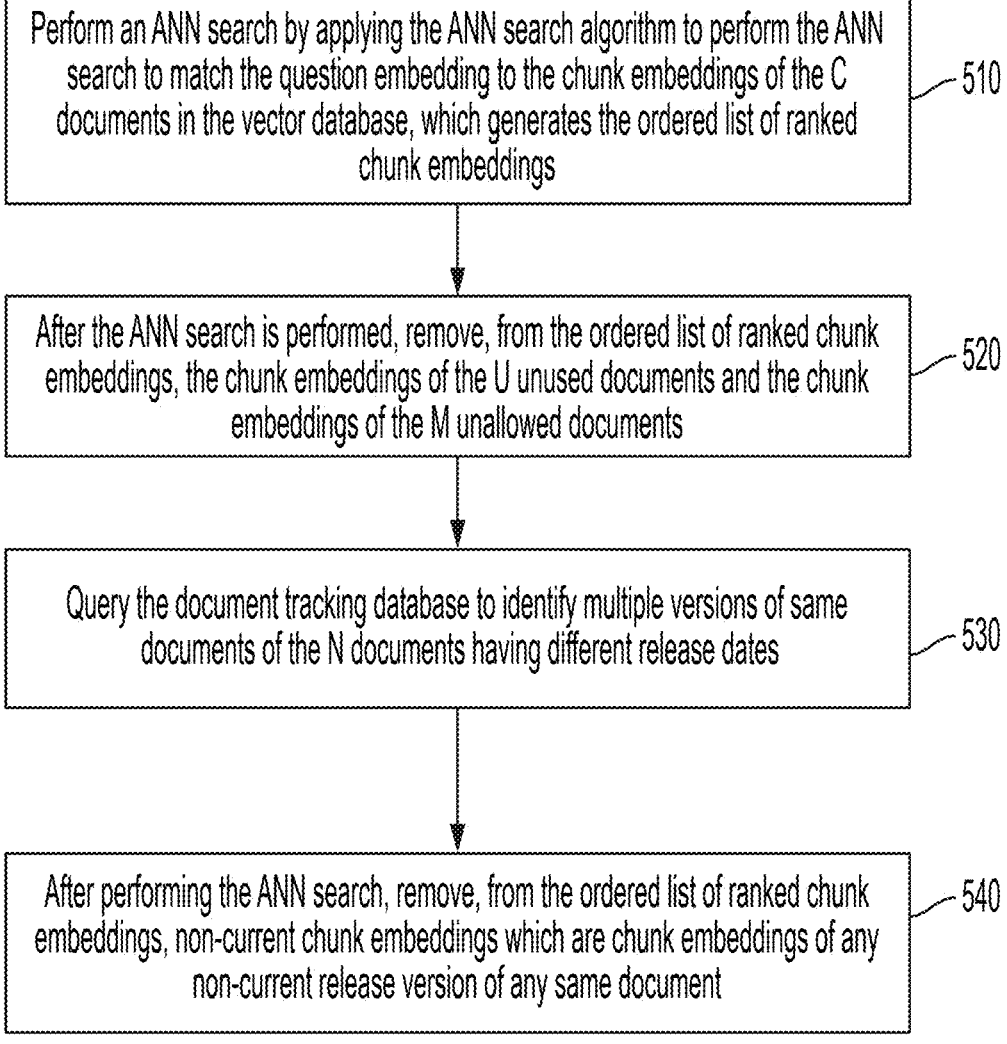

Perform an ANN search by applying the ANN search algorithm to perform the ANN search to match the question embedding to the chunk embeddings of the C documents in the vector database, which generates the ordered list of ranked chunk embeddings ⟵ 510

After the ANN search is performed, remove, from the ordered list of ranked chunk embeddings, the chunk embeddings of the U unused documents and the chunk embeddings of the M unallowed documents ⟵ 520

Query the document tracking database to identify multiple versions of same documents of the N documents having different release dates ⟵ 530

After performing the ANN search, remove, from the ordered list of ranked chunk embeddings, non-current chunk embeddings which are chunk embeddings of any non-current release version of any same document ⟵ 540

FIG. 5

GENERATION OF CONTEXT FOR A QUESTION SUBMITTED TO A GENERATIVE LANGUAGE MACHINE LEARNING MODEL

BACKGROUND

The present invention relates generally to artificial intelligence inference operations, and more specifically, to generating a context for a question submitted to a generative language machine learning model.

SUMMARY

Embodiments of the present invention provide a method, a computer program product, and a computer system.

An embedding model is applied to a question to generate a question embedding associated with the question, said question having been received from a user, said question configured to be submitted with associated context to a trained generative language machine learning model.

A specification of N documents from which the context may be inferred is received. The N documents are a subset of a corpus of C documents that was divided into chunks and chunk embeddings respectively associated with the chunks, wherein $1<N\leq C$. The chunk embeddings of the C documents are stored in a vector database. U unused documents consist of the C documents exclusive of the N documents.

A document tracking database is queried to select, from the N documents which are referenced in the document tracking database, M unallowed documents to which the user does not have access permission, wherein $0\leq M<N$.

A determination is made of whether N is less than a number-of-documents threshold (Nth), and if so then it is determined that a nearest neighbor (NN) search algorithm is a K-Nearest Neighbor (KNN) search algorithm, and if not then it is determined that the NN search algorithm is an Approximate Nearest Neighbor (ANN) search algorithm.

An ordered list of ranked chunk embeddings is generated which includes performing a NN search using the NN search algorithm to match the question embedding to a subset of the chunk embeddings of the C documents in the vector database, wherein the generated ordered list of ranked chunk embeddings does not include the chunk embeddings of the U unused documents and the chunk embeddings of the M unallowed documents.

BRIEF DESCRIPTION OF THE DRAWINGS

FIG. 1 depicts a computing environment which contains an example of an environment for the execution of at least some of the computer code involved in performing the inventive methods, in accordance with embodiments of the present invention.

FIG. 3 is a flow chart describing a method, in accordance with embodiments of the present invention.

FIG. 4 is a flow chart describing aspects of performing the NN search in a step of FIG. 3 if the NN search algorithm is the KNN search algorithm, in accordance with embodiments of the present invention.

FIG. 5 is a flow chart describing aspects of performing the NN search in a step of FIG. 3 if the NN search algorithm is the ANN search algorithm, in accordance with embodiments of the present invention.

DETAILED DESCRIPTION

Figure 2:
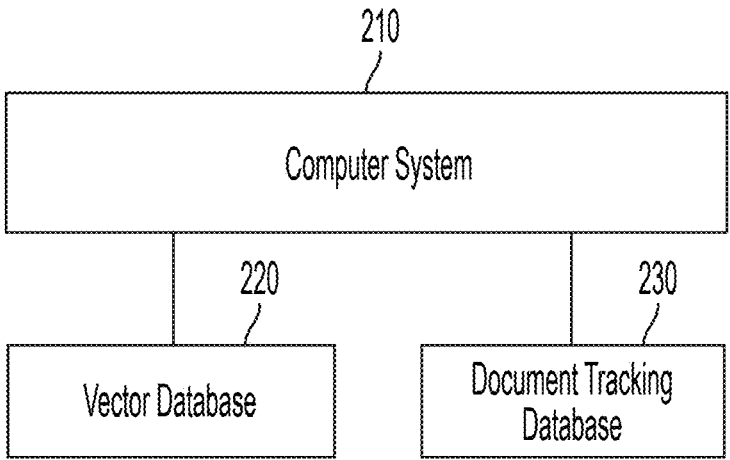
FIG. 2 depicts a computer system communicatively connected to a vector database and a document tracking database, in accordance with embodiments of the present invention.

According to an aspect of the invention, an embedding model is applied to a question to generate a question embedding associated with the question. The question was received from a user and is to be submitted with associated context to a trained generative language machine learning model. A specification of N documents from which the context may be inferred is received. The N documents are a subset of a corpus of C documents that was divided into chunks and chunk embeddings respectively associated with the chunks, wherein $1<N\leq C$. The chunk embeddings of the C documents are stored in a vector database. U unused documents consist of the C documents exclusive of the N documents. A document tracking database is queried to select, from the N documents which are referenced in the document tracking database, M unallowed documents to which the user does not have access permission, wherein $0\leq M<N$. A determination is made of whether N is less than a number-of-documents threshold (Nth), and if so then it is determined that a nearest neighbor (NN) search algorithm is a K-Nearest Neighbor (KNN) search algorithm, and if not then it is determined that the NN search algorithm is an Approximate Nearest Neighbor (ANN) search algorithm. An ordered list of ranked chunk embeddings is generated which includes an NN search being executed using the NN search algorithm to match the question embedding to a subset of the chunk embeddings of the C documents in the vector database. The generated ordered list of ranked chunk embeddings does not include the chunk embeddings of the U unused documents and the chunk embeddings of the M unallowed documents.

The preceding aspect of the invention provides a technical feature of generating an ordered list of ranked chunk embeddings by using both a vector database of embeddings of chunks of documents and a document tracking database to determine which documents the user has access to.

According to one embodiment, the context associated with the question is determined from the chunks associated with the ranked chunk embeddings, a prompt is formatted from the question and the context, the trained generative language machine learning model is executed using the prompt as input, and an answer to the prompt is received from the trained generative language machine learning model.

The preceding embodiment advantageously provides an answer to the prompt, where the answer takes into account a context for the question that was efficiently determined with high accuracy.

According to one embodiment, R documents consist of the N documents exclusive of the M unallowed documents, and a KNN search is performed by applying the KNN search algorithm to perform the KNN search to match the question embedding to the chunk embeddings of the C documents in the vector database, excluding the chunk embeddings of the R documents from the KNN search.

The preceding embodiment advantageously performs a KNN search to accurately identify chunk embeddings of the N documents with exclusion of the M unallowed documents to which the user does not have access permission.

According to one embodiment, the document tracking database is queried to identify multiple versions of same documents of the N documents having different release dates, wherein the generated ordered list of ranked chunk embeddings does not include non-current chunk embeddings which encompass chunk embeddings of any non-current release version of any same document, and wherein the non-current chunk embeddings are excluded from the KNN search.

The preceding embodiment advantageously excludes non-current chunk embeddings from the KNN search.

According to one embodiment, $N<C$ or $N=C$.

The preceding embodiment advantageously encompasses searching either the entire corpus of documents ($N=C$) or fewer documents than the entire corpus of documents ($N<C$) for documents potentially identifying context for the user's question.

According to one embodiment, an ANN search is performed by applying the ANN search algorithm to perform the ANN search to match the question embedding to the chunk embeddings of the C documents in the vector database; and after the ANN search is performed, the chunk embeddings of the U unused documents and the chunk embeddings of the M unallowed documents are removed from the ordered list of ranked chunk embeddings.

The preceding embodiment advantageously removes, from the ordered list of ranked chunk embeddings, chunks that are not within the scope of the N documents specified by the user and chunks of documents to which the user does not have access.

According to one embodiment, the document tracking database is queried to identify multiple versions of same documents of the N documents having different release dates; and after the ANN search and querying the document tracking database are performed, the non-current chunk embeddings are removed from the ordered list of ranked chunk embeddings, wherein the outdated non-current chunk embeddings are chunk embeddings of any non-current release version of any same document.

The preceding embodiment advantageously removes non-current chunk embeddings from the ordered list of ranked chunk embeddings that was outputted by the ANN search.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100 which contains an example of an environment for the execution of at least some of the computer code involved in performing the inventive methods, in accordance with embodiments of the present invention. Such computer code includes new code for generating a context to accompany a user's question for creating a prompt to a generative language machine learning model 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Embodiments of the present invention generate prompts to be inputted to a trained generative language machine learning model such as, inter alia, a large language model (LLM). Although much of the description presented herein expresses embodiments of the present invention in terms of an LLM, such embodiments are generally applicable to any generative language machine learning model.

Retrieval Augmented Generation (RAG) is a technique that grants generative artificial intelligence (AI) models information retrieval capabilities and modifies interactions with a large language model (LLM) so that the LLM responds to user queries with reference to a specified set of documents. While RAG provides a well-established pattern for finding relevant content to provide as context in an AI inference operation, there are obstacles to use of RAG with a corpus of documents (e.g., in an enterprise content management (ECM) system). Such obstacles found with generative AI (e.g., in an ECM environment) include lack of control of access to content in a vector database and an existence of multiple versions of a document in the vector database.

With respect to control of access to content in a vector database, documents are subject to a fine-grained authorization model, where only certain users have access to any given document. However, when the given documents are broken into chunks and stored in the vector database (e.g., as a part of an ECM system), the vector database is not capable of enforcing proper access to this content, and in some system configurations only another system (e.g., an ECM system) can do that.

With respect to the existence of multiple versions of a document in the vector database, when multiple versions of a document exist (e.g., in an ECM system), it may be desirable to use only the current release version as a basis for AI inference. Including content from non-current release versions risks providing duplicate information, or potentially obsolete, incorrect information RAG is used for producing generative AI responses from a large language model (LLM), based on an existing corpus of content. In the RAG pattern, a series of steps are followed to index documents (or other content), into a vector database in a way that makes the content accessible as input for an LLM prompt via steps that include the following steps: (i) text is extracted from each document; (ii) the extracted text is broken up into chunks conforming to a size limitation; (iii) an embedding model is used to generate an embedding in a form of a vector for each chunk; and (iv) each vector is then inserted into a vector database, along with the corresponding chunk text and associated metadata.

After any pre-existing documents have been vector indexed, a process is established to ensure that any new documents are added to the vector index and that deleted documents are removed from the vector index. Specifically: (i) a new document that is created is vector indexed as a new version series in the vector index; (ii) a new version of an existing document that is created is indexed as a new document within the same version series; (iii) when a document version is deleted, all of the document version's chunks are removed from the vector index; and (v) when an entire document version series is deleted, all chunks of all versions for the version series are removed from the vector index.

A vector index is a data structure used in a vector database to efficiently retrieve information based on a query vector. The vector index maps vectors to stored data items, enabling similarity searches. In one embodiment, a vector index is a table having the following columns: chunk index (e.g., 1, 2, 3, . . . ); chunk text, and chunk embedding which is a numerical vector representation of the chunk text denoting encoded features of the chunk text where the chunk embedding was generated by an embedding model.

Users may use the vector index to perform queries from a large language model, where the queries are based on the context of the documents. When a user asks a question, the vector index is used to augment the user's question, to form the prompt to the LLM in accordance with the following steps: (i) the same embedding model that was used to produce vectors for document text is now used to produce an embedding for the user's question; (ii) the vector produced by the embedding model for the user's question is passed to the vector database to perform a nearest neighbor (NN) query, which finds the matching vectors in the vector database which are mathematically closest to the vector representing the user's question; (iii) the matching vectors from the vector query are ordered by their relevancy ranking, producing a list of document chunks which are ordered by how closely the document chunks relate to the user's question, and these ordered document chunks form the context of the LLM request; (iv) the text from the matching vectors is formatted using a prompt template, into a prompt which includes the user's question along with the related document text, and (v) the prompt is sent to the LLM to generate a response to the user's question.

Embodiments of the present invention provide control of document versioning and control of security access for generative AI applications that provide responses based on content that is stored in documents within a system (e.g., an ECM system). Document chunks related to a question are configured to be submitted to a trained generative language machine learning model (GLMLM) and are retrieved in a process that uses both a vector database search and a document tracking database search. The chunks are formatted with the question into a prompt to be submitted to the GLMLM. Embodiments of the present invention ensure that only documents which the user has access to are used to format the prompts. Embodiments of the present invention also ensure that only the current released version of a document is used, which ensures the integrity of the responses provided by the GLMLM, by not including obsolete data in the prompt.

Embodiments of the present invention allow users to obtain answers from an LLM which are informed by the context of the users' documents, which may be very useful if the user does not know which documents should be used as a basis for answering the user's question, in which case the entire vector database is searched, in one embodiment, for document chunks which are relevant to the user's question.

Embodiments of the present invention encompass cases where a known set of documents, or even one single document, are specified by the user as the basis for answering the question. If there is a set of documents specified by the user, then a search may be performed across only those specified documents to find the most relevant document text.

In a scenario in which only a single document is specified by the user, the approach is useful at least for a large document, where the amount of extracted text found in the large document exceeds the limit of the context that can be passed into the large language model. In this scenario, the RAG approach finds the subsets of the extracted text from the single document which are most relevant to the user's question.

ECM systems support document versioning operations. As documents go through different editing and review phases, different versions of the document are created. Minor versions are works in progress, while major versions can be published to a wider audience. The sequence of document versions produced in this process are grouped in a "version series". The "current release version" is the version that viewers of the document will see. Document editors can promote or demote versions, controlling which version is the current released version. Users interacting with an ECM system will typically only see the current released version. Data in minor versions, or non-current release versions, is preserved for the historical record, but may not be suitable for public consumption.

ECM systems can also have very rich, fine grained access models. Access permissions can be granted or denied to individual users, groups of users, or user roles. Access permissions can be inherited from folders, parent documents, roles, or other custom objects. Access permissions can also be controlled by properties of the document, in various discretionary or mandatory access control mechanisms.

The data needed to manage document version information and document access permissions is an integral part of an ECM system. This needed data cannot be delegated or replicated to an external database, such as a vector database that is maintained for generative AI search functionality.

Embodiments of the present invention provide an ability for applications to generate RAG-based answers from a Large Language Model (LLM) based on the context of documents which are stored in a repository.

Embodiments of the present invention ensure that only appropriate document chunks are used as the basis for LLM prompts and retrieve document chunks from the vector database in combination with a filtering process which uses information from a document tracking database which references documents whose chunks may be searched in the vector database. In one embodiment, the filtering process ensures that only documents for which the user has access permission can be used as context for the query to the LLM. In one embodiment, the filtering process also ensures that when an entire corpus of documents is searched, only the current release version of a given document is used as context.

One embodiment of the present invention searches an entire corpus of C documents to provide context for a question to be submitted to the LLM, and another embodiment of the present invention searches a set of known documents (which may be specified in the user's request that includes the user's question to be submitted to the LLM), which is less than the entire corpus of C documents, to provide context for the question to be submitted to the LLM.

Embodiments of the present invention search N documents using a nearest neighbor (NN) search algorithm, wherein $1<N\leq C$, to provide context for a question to be submitted to the LLM. If $N<N_{th}$, wherein $N_{th}$ is a specified number-of-documents threshold, then the NN search algorithm is a K-Nearest Neighbor (KNN) search algorithm. If $N\geq N_{th}$, then the NN search algorithm is an Approximate Nearest Neighbor (ANN) search algorithm. These embodiments use the test of whether $N<N_{th}$ to determine whether to use a KNN search algorithm or an ANN search algorithm, because the ANN search algorithm is more efficient, but less accurate, than the KNN search algorithm, especially when a large number of documents is searched. Table 1 presents different illustrative combinations of C, N, $N_{th}$, and KNN or ANN for each combination.

TABLE 1

| C | N | $N_{th}$ | KNN or ANN |
|---|---|---|---|
| 1000 | 1000 | 900 | ANN |
| 1000 | 999 | 900 | ANN |
| 1000 | 900 | 900 | ANN |
| 1000 | 899 | 900 | KNN |
| 10 | 10 | 900 | KNN |
| 10 | 9 | 900 | KNN |

In Table 1, the entire corpus of C documents is not searched via ANN in the cases of C being small (i.e., for C=10 in Table 1).

The KNN search algorithm is used to perform a filtered query of the vector database, where the filter limits the vector search to only those documents that were specified in the user's request to have the LLM respond to the user's question. Vector databases support pre-filtering based on document metadata when the KNN algorithm is in use to ensure that the user has access to each of the specified documents. Any documents which the caller does not have access to are excluded from being searched, by being included in a pre-filter condition on execution of the KNN search algorithm on the vector database.

The ANN search algorithm is used to perform an unfiltered query of the vector database (i.e., on all documents on the vector database), because vector databases do not support pre-filtering based on document metadata when the ANN search algorithm is used. The ANN search algorithm may be preferable to the KNN search algorithm if the number of documents searched is large (e.g., millions of documents), because the KNN search algorithm will not scale to a sufficiently large number of documents, which may occur if $N_{th}$ is sufficiently large and $N\geq N_{th}$.

If the ANN search algorithm is used, the query on the vector database is performed first, without any filter conditions, using the ANN algorithm, which results in the set of document chunks which are mathematically closest to the caller's question, using a vector search across the entire vector database. The results of the vector query are then post-filtered by a query on the document tracking database to filter out documents that the caller may not have access to.

In one embodiment, the user may select only a current release version of a document if chunk embeddings of multiple versions of the document exist in the vector database. In this embodiment, documents which are not the current release version of the document are included in the pre-filter condition if the KNN search algorithm is used and are post-filtered out if the ANN search algorithm is used.

In one embodiment, the user may select any document version, so documents are not filtered to allow only current versions.

Once the set of filtered document chunks are obtained by the KNN search algorithm or the ANN search algorithm as described supra, these chunks are formatted into a prompt (e.g., using an LLM prompt template), along with the user's original question, to generate a response from the LLM. In one embodiment, the response, along with the document chunks which were used as context, are persisted to a database and returned to the calling application, which provides traceability and explainability, so that the generated answer to the question and the document whose content was used to generate the context for the prompt may be displayed.

FIG. 2 depicts a computer system 210 communicatively connected to a vector database 220 and a document tacking database 230, in accordance with embodiments of the present invention.

Figure 6:
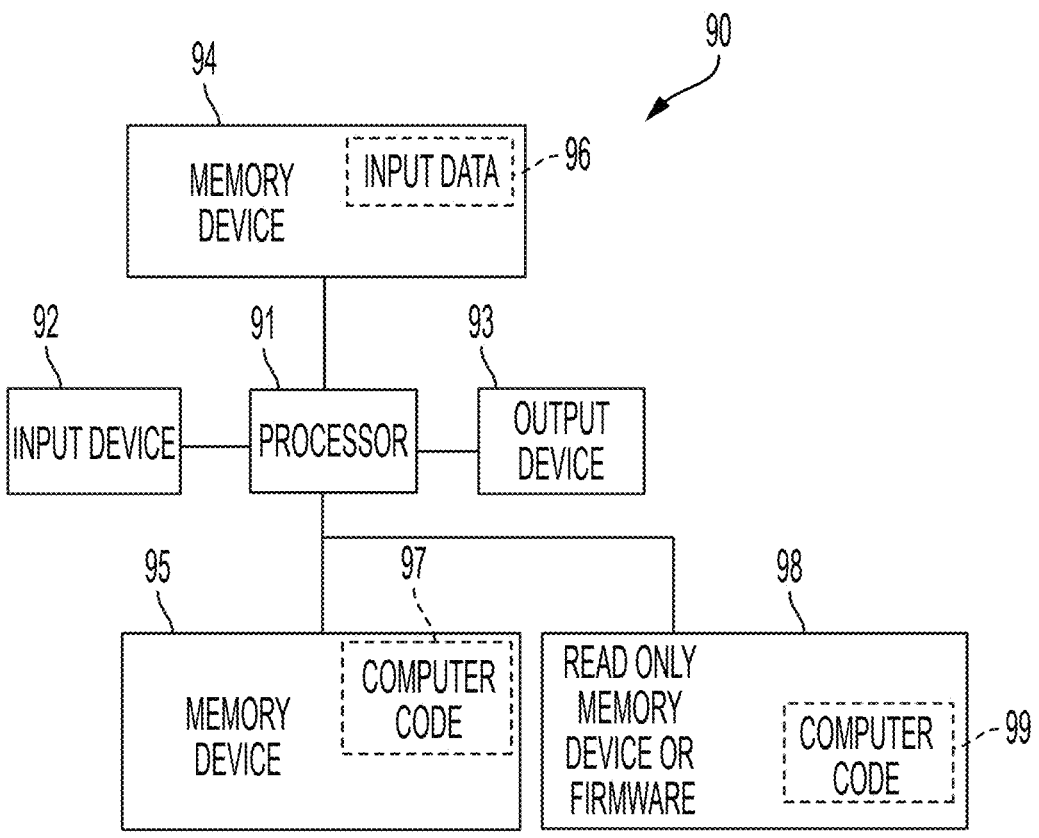
FIG. 6 illustrates a computer system, in accordance with embodiments of the present invention.

The computer system 210 may represent the computing environment 100 of FIG. 1 or the computer system 90 of FIG. 6.

The vector database 220 stores chunk embeddings of associated chunks of documents of a corpus of C documents. Each chunk of a document comprises text and each chunk embedding is a vector containing numerical values that collectively convey information about the text in the associated chunk. The conveyed information about the text may include, inter alia: contextual information, semantic meaning, syntactic properties (e.g., parts of speech, sentence structure, etc.), latent features (e.g., tone indicative of positive or negative sentiment). A context for the user's question may be inferred from the conveyed information contained in the chunk embeddings.

The document tracking database 230 stores: (i) an identification of users having access permission for each document of the C documents whose chunk embeddings are stored in the vector database 220; and (ii) an identification of a version number and an associated release date for each document of the C documents having multiple versions and an identification of which version is the current release version defined as the version currently in use.

FIG. 3 is a flow chart describing a method, in accordance with embodiments of the present invention. The flow chart of FIG. 3 includes steps 310-380.

Step 310 applies an embedding model to a question to generate a question embedding associated with the question. The question has been received from a user. The question is to be submitted with associated context to a trained generative language machine learning model.

The specification of N documents may be determined from, inter alia, user input that controls how the N documents are determined. In one embodiment, the user may input a character variable of "C" or "Corpus" to specify the entire corpus of C documents, which implies N=C. In one embodiment, the user may input a logical criteria such as "Words<1000" to specify all documents of the corpus having less than 1000 words. In one embodiment, the user may specify the N documents explicitly by specifying a unique identifier of the document such as the title of the document or a value of a primary key in a database table having a column that lists documents. The user is not required to explicitly specify the numerical value of N, because the numerical value of N can be determined from the user input. There is no limit to the scope of how the N documents may be specified by the user.

Step 315 receives a specification of N documents from which the context may be inferred. The N documents are a subset of a corpus of C documents that was divided into chunks and chunk embeddings respectively associated with the chunks, wherein $1<N\leq C$. The chunk embeddings of the C documents are stored in the vector database 220. U unused documents consists of the C documents exclusive of the N documents.

Step 320 queries the document tracking database 230 to select, from the N documents which are referenced in the document tracking database 230, M unallowed documents to which the user does not have access permission, wherein $0\leq M<N$ Step 330 determines whether N is less than a number-of-documents threshold ($N_{th}$), and if so (Yes branch from step 330) then step 335 is next executed, and if not (No branch from step 330) then step 340 is next executed.

Step 335 determines that a nearest neighbor (NN) search algorithm is a K-Nearest Neighbor (KNN) search algorithm, and step 340 determines that the NN search algorithm is an Approximate Nearest Neighbor (ANN) search algorithm.

Step 350 generates an ordered list of ranked chunk embeddings. Generating the ordered list comprises performing an NN search using the NN search algorithm to match the question embedding to a subset of the chunk embeddings of the C documents in the vector database. The generated ordered list of ranked chunk embeddings does not include the chunk embeddings of the U unused documents and the chunk embeddings of the M unallowed documents.

Aspects of performing the NN search if the NN search algorithm is the KKN search algorithm or the ANN search algorithm are described in FIG. 4 or FIG. 5, respectively.

Step 360 determines, from the chunks associated with the ranked chunk embeddings, the context associated with the question.

Step 370 formats, from the question and the context, the prompt.

Step 380 executes the trained generative language machine learning model using the prompt as input, and receives, from the trained generative language machine learning model, an answer to the prompt.

FIG. 4 is a flow chart describing aspects of performing the NN search in step 350 of FIG. 3 if the NN search algorithm is the KNN search algorithm, in accordance with embodiments of the present invention. The flow chart of FIG. 4 includes steps 410-420.

Step 410 applies the KNN search algorithm to perform the KNN search to match the question embedding to the chunk embeddings of R documents in the vector database, wherein the R documents consist of the N documents exclusive of the M unallowed documents.

In one embodiment, step 420 queries the document tracking database 230 to identify multiple versions of same documents of the N documents having different release dates, wherein the generated ordered list of ranked chunk embeddings does not include non-current chunk embeddings which encompass chunk embeddings of any non-current release version of any same document, wherein a non-current release version is defined as a version that is not the current release version, and wherein the non-current chunk embeddings are excluded from the KNN search performed in step 410. The current release version, which pertains to the document version currently in use, may or may not have the latest release date.

FIG. 5 is a flow chart describing aspects of performing the NN search in step 350 of FIG. 3 if the NN search algorithm is the ANN search algorithm, in accordance with embodiments of the present invention. The flow chart of FIG. 5 includes steps 510-540.

Step 510 applies the ANN search algorithm to perform the ANN search to match the question embedding to the chunk embeddings of the C documents in the vector database, which generates the ordered list of ranked chunk embeddings.

After step 510 has been performed, step 520 removes, from the ordered list of ranked chunk embeddings, the chunk embeddings of the U unused documents and the chunk embeddings of the M unallowed documents.

In one embodiment, step 530 queries the document tracking database 230 to identify multiple versions of same documents of the N documents having different release dates.

After steps 510 and 530 have been performed, step 540 removes, from the ordered list of ranked chunk embeddings, non-current chunk embeddings which are chunk embeddings of any non-current release version of any same document.

FIG. 6 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, the method comprising:

applying an embedding model to a question to generate a question embedding associated with the question, the question having been received from a user, the question configured to be submitted with associated context to a trained generative language machine learning model;

receiving a specification of N documents from which the context may be inferred, the N documents being a subset of a corpus of C documents that was divided into chunks and chunk embeddings respectively associated with the chunks, wherein $1 < N \leq C$, wherein the chunk embeddings of the C documents are stored in a vector database, and wherein U unused documents consist of the C documents exclusive of the N documents;

querying a document tracking database to select, from the N documents which are referenced in the document tracking database, M unallowed documents to which the user does not have access permission, wherein $0 \leq M < N$;

determining whether N is less than a number-of-documents threshold ($N_{th}$), and if so then determining that a nearest neighbor (NN) search algorithm is a K-Nearest Neighbor (KNN) search algorithm, and if not then determining that the NN search algorithm is an Approximate Nearest Neighbor (ANN) search algorithm; and generating an ordered list of ranked chunk embeddings, the generating the ordered list comprising performing a NN search using the NN search algorithm to match the question embedding to a subset of the chunk embeddings of the C documents in the vector database, wherein the generated ordered list of ranked chuck embeddings does not include the chunk embeddings of the U unused documents and the chuck embeddings of the M unallowed documents.

2. The method of claim 1, the method further comprising:

determining, from the chunks associated with the ranked chunk embeddings, the context associated with the question;

formatting, from the question and the context, a prompt; and executing the trained generative language machine learning model using the prompt as input, and receiving, from the trained generative language machine learning model, an answer to the prompt.

3. The method of claim 1, wherein $N<N_{th}$, wherein R documents consist of the N documents exclusive of the M unallowed documents, and wherein the performing the NN search comprises performing the KNN search by applying the KNN search algorithm to perform the KNN search to match the question embedding to the chunk embeddings of the R documents in the vector database.

4. The method of claim 3, wherein the method comprises:

querying the document tracking database to identify multiple versions of same documents of the N documents having different release dates, wherein the generated ordered list of ranked chunk embeddings does not include non-current chunk embeddings which encompass chunk embeddings of any non-current release version of any same document, and wherein the non-current chunk embeddings are excluded from the KNN search.

5. The method of claim 3, wherein $N<C$.

6. The method of claim 3, wherein $N=C$.

7. The method of claim 1, wherein $N\geq N_{th}$, and wherein the performing the NN search comprises:

performing an ANN search by applying the ANN search algorithm to perform the ANN search to match the question embedding to the chunk embeddings of the C documents in the vector database; and after the performing the ANN search, removing, from the ordered list of ranked chunk embeddings, the chunk embeddings of the U unused documents and the chunk embeddings of the M unallowed documents.

8. The method of claim 7, wherein the method comprises:

querying the document tracking database to identify multiple versions of same documents of the N documents having different release dates; and after the performing the ANN search and the querying the document tracking database, removing, from the ordered list of ranked chunk embeddings, non-current chunk embeddings which are chunk embeddings of any non-current release version of any same document.

9. The method of claim 7, wherein $N<C$.

10. The method of claim 7, wherein $N=C$.

11. A computer program product, comprising one or more computer readable storage media storing computer readable program instructions, the program instructions executable by one or more processors of a computer system to cause the computer system to perform operations, the operations comprising:

applying an embedding model to a question to generate a question embedding associated with the question, the question having been received from a user, the question configured to be submitted with associated context to a trained generative language machine learning model;

receiving a specification of N documents from which the context may be inferred, the N documents being a subset of a corpus of C documents that was divided into chunks and chunk embeddings respectively associated with the chunks, wherein $1<N\leq C$, wherein the chunk embeddings of the C documents are stored in a vector database, and wherein U unused documents consist of the C documents exclusive of the N documents;

querying a document tracking database to select, from the N documents which are referenced in the document tracking database, M unallowed documents to which the user does not have access permission, wherein $0\leq M<N$;

determining whether N is less than a number-of-documents threshold ($N_{th}$), and if so then determining that a nearest neighbor (NN) search algorithm is a K-Nearest Neighbor (KNN) search algorithm, and if not then determining that the NN search algorithm is an Approximate Nearest Neighbor (ANN) search algorithm; and generating an ordered list of ranked chunk embeddings, the generating the ordered list comprising performing a NN search using the NN search algorithm to match the question embedding to a subset of the chunk embeddings of the C documents in the vector database, wherein the generated ordered list of ranked chuck embeddings does not include the chunk embeddings of the U unused documents and the chuck embeddings of the M unallowed documents.

12. The computer program product of claim 11, the operations further comprising:

determining, from the chunks associated with the ranked chunk embeddings, the context associated with the question;

formatting, from the question and the context, a prompt; and executing the trained generative language machine learning model using the prompt as input, and receiving, from the trained generative language machine learning model, an answer to the prompt.

13. The computer program product of claim 11, wherein $N<N_{th}$, wherein R documents consist of the N documents exclusive of the M unallowed documents, and wherein the performing the NN search comprises performing the KNN search by applying the KNN search algorithm to perform the KNN search to match the question embedding to the chunk embeddings of the R documents in the vector database.

14. The computer program product of claim 13, wherein the operations further comprise:

querying the document tracking database to identify multiple versions of same documents of the N documents having different release dates, wherein the generated ordered list of ranked chunk embeddings does not include non-current chunk embeddings which encompass chunk embeddings of any non-current release version of any same document, and wherein the non-current chunk embeddings are excluded from the KNN search.

15. The computer program product of claim 11, wherein $N\geq N_{th}$, and wherein the performing the NN search comprises:

performing an ANN search by applying the ANN search algorithm to perform the ANN search to match the question embedding to the chunk embeddings of the C documents in the vector database; and after the performing the ANN search, removing, from the ordered list of ranked chunk embeddings, the chunk embeddings of the U unused documents and the chunk embeddings of the M unallowed documents.

16. The computer program product of claim 15, wherein the operations further comprise:

querying the document tracking database to identify multiple versions of same documents of the N documents having different release dates; and after the performing the ANN search and the querying the document tracking database, removing, from the ordered list of ranked chunk embeddings, non-current chunk embeddings which are chunk embeddings of any non-current release version of any same document.

17. A computer system, comprising one or more processors, one or more memories, and one or more computer readable storage media, and computer readable program instructions executable by the one or more processors via the one or more memories to cause the computer system to perform operations, the operations comprising:

applying an embedding model to a question to generate a question embedding associated with the question, the question having been received from a user, the question configured to be submitted with associated context to a trained generative language machine learning model;

receiving a specification of N documents from which the context may be inferred, the N documents being a subset of a corpus of C documents that was divided into chunks and chunk embeddings respectively associated with the chunks, wherein $1 < N \leq C$, wherein the chunk embeddings of the C documents are stored in a vector database, and wherein U unused documents consist of the C documents exclusive of the documents;

querying a document tracking database to select, from the N documents which are referenced in the document tracking database, M unallowed documents to which the user does not have access permission, wherein $0 \leq M < N$;

determining whether N is less than a number-of-documents threshold ($N_{th}$), and if so then determining that a nearest neighbor (NN) search algorithm is a K-Nearest Neighbor (KNN) search algorithm, and if not then determining that the NN search algorithm is an Approximate Nearest Neighbor (ANN) search algorithm; and generating an ordered list of ranked chunk embeddings, the generating the ordered list comprising performing a NN search using the NN search algorithm to match the question embedding to a subset of the chunk embeddings of the C documents in the vector database, wherein the generated ordered list of ranked chuck embeddings does not include the chunk embeddings of the U unused documents and the chuck embeddings of the M unallowed documents.

18. The computer system of claim 17, the operations further comprising:

determining, from the chunks associated with the ranked chunk embeddings, the context associated with the question;

formatting, from the question and the context, a prompt; and executing the trained generative language machine learning model using the prompt as input, and receiving, from the trained generative language machine learning model, an answer to the prompt.

19. The computer system of claim 17, wherein $N < N_{th}$, wherein R documents consist of the N documents exclusive of the M unallowed documents, and wherein the performing the NN search comprises performing the KNN search by applying the KNN search algorithm to perform the KNN search to match the question embedding to the chunk embeddings of the R documents in the vector database.

20. The computer system of claim 17, wherein $N \geq N_{th}$, and wherein the performing the NN search comprises:

performing an ANN search by applying the ANN search algorithm to perform the ANN search to match the question embedding to the chunk embeddings of the C documents in the vector database; and after the performing the ANN search, removing, from the ordered list of ranked chunk embeddings, the chunk embeddings of the U unused documents and the chunk embeddings of the M unallowed documents.

\*   \*   \*   \*   \*